Sept. 13, 1966　　　　J. C. HARPER　　　　3,271,873
METHOD AND APPARATUS FOR DRYING MATERIALS
Filed Sept. 12, 1963

INVENTOR.
JOHN C. HARPER
BY
Townsend and Townsend
ATTORNEYS 3,271,873
METHOD AND APPARATUS FOR DRYING
MATERIALS
John C. Harper, Rte. 1, Willowbank 11, Davis, Calif.
Filed Sept. 12, 1963, Ser. No. 308,385
9 Claims. (Cl. 34—5)

This invention relates to a method of increasing the drying rate of drying processes. More particularly, this invention relates to a method of increasing the drying rate of vacuum and freeze-drying process in which food or biological products can be handled.

One important factor affecting the cost of a drying process is the rate of drying. Drying processes generally require that heat be supplied to a material to vaporize its moisture content and that some medium be provided to carry away those vapors that are formed. In many instances of drying solid materials, the process proceeds in such a manner that eventually vapor is formed within the material and then diffuses or flows through a more or less porous, already dry outer shell to escape from the material. In addition, the heat required for vaporization must then be transferred into the moist material from the outside through this dry outer shell. If drying proceeds in the manner described above, any means of increasing the rate of inward heat flow or the outward flow or diffusion of water vapor will cause an increase in the rate of drying.

In all drying processes, whether conducted at atmospheric pressure or in a partial vacuum, the material is in the presence of some gas medium (usually air), which tends to fill the pore space in any porous, dry shell. Now the rate of heat flow inward to the moisture in the material interior depends on the thermal conductivity of the porous outer shell. The thermal conductivity of this porous shell, in turn, depends on the thermal conductivity of the gas in the pore space. In addition, the rate of moisture diffusion outward depends on the coefficient of diffusion of water vapor through this gas. Thus, it can be seen that it is possible to change the rate of drying by changing the composition of the gas surrounding the material.

In this invention it has been discovered that the addition of certain light gases to the drying atmosphere results in a substantial increase in the drying rate. One of the gases is helium which has a thermal conductivity of about six times that of air, and the coefficient of diffusion of water vapor is of about four times that of air. The corresponding values for hydrogen gas are similar to those for helium. Thus, if the air in the pore spaces of the material being dried is replaced with either helium or hydrogen, an increased drying rate will be obtained. The use of helium, however, is preferred over hydrogen because of the danger of explosion with hydrogen. An added advantage is that the gas surrounding the material need not be pure since partial benefits will be gained if the air is only partially replaced by the other gas.

It should be noted that this process is quite different from one that uses a stream of heated gas to carry heat to the material. In this case, the benefit would be dependent on the flow rate of the gas and its heat capacity; whereas in the present invention, the benefit depends on the thermal conductivity and coefficient of diffusion of the gas, and a flowing stream of gas is not required. However, in some instances, a heated stream of helium or hydrogen might be used to give additional benefits over those provided by the present invention.

It has been further discovered that with a reduction in a drying atmosphere air pressure, as in a vacuum drying process, the thermal conductivity of the porous, gas-filled outer shell decreases, and that the possible advantages from replacing the surrounding air with helium or hydrogen are greater than in the case of atmospheric pressure drying.

Another discovery has been that with the use of hydrogen and helium in a particular vacuum drying process known as freeze-drying, the drying rate and benefits of freeze-drying have been unexpectedly improved. By way of background, freeze-drying consists of first freezing the material to be dried and then supplying heat to the frozen material in such a way that the frozen moisture sublimes directly from solid into vapor and does not thaw to form a liquid. In practice, this result is usually accomplished by maintaining the material in a vacuum atmosphere during drying. It is also possible to conduct freeze-drying at atmospheric pressure by subjecting the frozen material to a stream of dry, heated gas. The advantage of freeze-drying for food products is that the products are usually of much superior quality to those dried by other methods. Freeze-drying is also particularly well suited for drying pharmaceutical and other biological products.

In freeze-drying, as the sublimation of ice proceeds, the ice phase recedes inward and becomes surrounded by a shell of porous, dry material. This outer dry shell is an excellent thermal insulator, and its presence forms a serious impediment to the flow of heat necessary for sublimation. This insulating layer is the primary obstacle in the achievement of rapid drying rates. A certain improvement in drying rate may be achieved by increasing the temperature of the heat source, but a point is soon reached at which the material is damaged by excessively high surface temperature. It is also possible in some cases to increase the drying rate by increasing the air pressure in the drying chamber, thus creating a higher thermal conductivity in the dry shell. The benefit from this procedure is limited to a minor gain by the nature of the drying mechanism. It has been discovered that a major gain in drying rate can be achieved by replacing the air in the pore spaces with either helium or hydrogen as described above.

Accordingly, it is an object of my invention to provide drying processes in which a light gas having relatively high coefficients of thermal conductivity and of diffusion for water vapor is introduced into the drying chamber in such a manner that the light gas will impregnate any relatively dry porous shell surrounding the material being dried.

A more specific object is to provide a drying process of the above type in which the light gas is helium or hydrogen.

An advantage of using a light gas such as helium or hydrogen lies in the fact that these gases have much higher thermal conductivities than air, thus permitting a much higher rate of heat flow into the central portion of the material body for evaporation or sublimation of moisture.

Another advantage is that the coefficient of diffusion of water vapor through these light gases is much greater than through air, so that vapors formed during drying are much better able to escape through the surrounding relatively dry shell than if air was present in the pore spaces.

Still another advantage resides in the fact that if the material being dried is undesirably affected by being subject to oxidation by the oxygen of the air, the light gases provide an inert atmosphere that prevents such oxidation and can result in a dried product of improved quality.

Still another object of this invention is to provide a vacuum drying process in which a light gas having relatively high coefficients of thermal conductivity and vapor diffusion is mixed with varying amounts of air to provide a gaseous vacuum atmosphere which has an increased drying rate over that of air alone. An advantage of mixing light gas with the air resides in the reduction in operating expenses.

Still another object is to provide a drying process of the above types in which the pressure of this drying atmosphere is maintained in a partial vacuum or reduced pressure relative to normal atmosphere pressure.

Yet another object of this invention is to provide a freeze drying process of the above type in which the material is frozen before being dried in the above manner.

Other objects, features and advantages of this invention will become apparent upon reading the following description and referring to the accompanying drawing in which.

Figure 1:
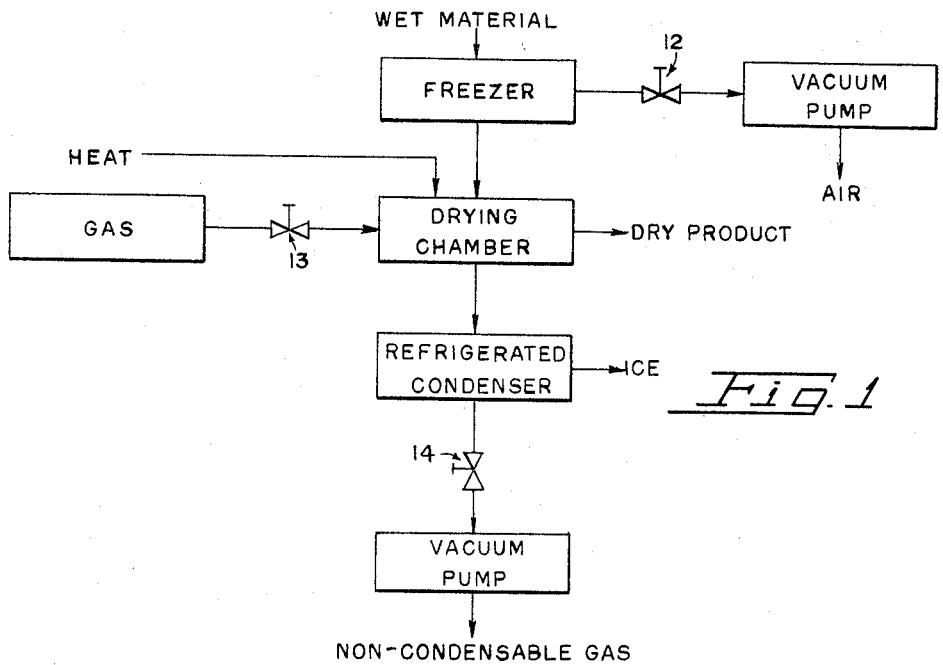
FIGURE 1 illustrates a freeze-drying process in flow diagram form using a refrigerated condensor.

In freeze drying materials, such as food, the material is first subjected to an ambient atmosphere having a temperature low enough to turn the moisture within the material from a liquid state to a solid state more commonly known as ice. By maintaining the ambient pressure of the freeze atmosphere at a moderate vacuum pressure such as 5–10 mm. Hg during freezing, a substantial portion of trapped air can be removed from the material. In addition, the vacuum has a tendency to evaporate a portion of excess moisture and results in increased efficiency of freezing. It should, however, be noted that it is not necessary to freeze the material in a vacuum and that control valve 12 to the vacuum pump can be closed off.

The frozen material can then be sealed in an air-tight drying chamber to vaporize the frozen moisture during a drying cycle. First, the ambient pressure within the drying chamber is reduced to an appropriately low level, say, for instance, on the order of 1.0 mm. of Hg; and external heat is applied to the material by means of direct radiation or heated plates. During the initial part of this drying cycle, sublimation or vaporization of the frozen moisture occurs at a very rapid rate and, by nature, starts in the outer layer and progresses inwardly toward the center of the material. This results in the sublimed portion of the material forming a dry porous shell about the still frozen core. Since the thermal conductivity of this shell is a combination of the thermal conductivities of the dried material and whatever gas is left in the pores, it becomes an effective insulator and hinders the externally applied heat of sublimation from reaching the still frozen core. Thus, the insulation reduces the drying rate to an undesirably low rate.

In order to overcome this problem, the chamber is further evacuated to a low pressure, preferably 0.1 mm. Hg or less, in order to remove as much air as possible. A light gas having a relatively high coefficient of thermal conductivity and high coefficient of diffusion for water vapor is then allowed to flow into the drying chamber until a desired gas pressure is attained. As a result of this procedure, the air in the pore spaces of the shell is substantially replaced with the light gas, thereby providing for improved conduction of heat and diffusion of water vapor. The desired gas pressure depends on several conditions, such as: the temperature at which the frozen core must be maintained for the particular material being dried; the means used for supplying the heat of sublimation; the method of removal of water vapor from the gaseous atmosphere in the chamber; and various other factors. In practice, it will usually be found that the desired gas pressure will lie in a range from about 0.5 mm. Hg to 10 mm. Hg, although pressures both below this range and above it as high as atmospheric pressure can be used.

In accordance with the above discussion, one gas which has been found to be especially effective is helium. This gas is characterized by a coefficient of thermal conductivity approximately six times as great as that of air and a coefficient of water vapor diffusion approximately four times as great as that of air. As a result of these two combined characteristics it can be shown that the drying rate for the pure helium atmosphere, as compared with an all air atmosphere, will be increased almost by a factor of three.

In order to decrease operating costs by reducing the amount of helium used, the helium gas can be combined with air if desired. For practical purposes, the amount of helium added to the air should not be less than 10% helium and 90% air at the lower limit.

Another gas having the desired characteristics which could be used is hydrogen. Hydrogen, however, has the disadvantage of creating an explosive atmosphere. In addition, helium, hydrogen and air could be intermixed within the above stated limits with regard to the helium gas.

The above discussed drying by light gas is fully capable of being used in either intermittent or continuous processes. When an intermittent, or batch, process is used, the frozen material is first placed in the vacuum sealed drying chamber, and the air or gas within the drying chamber brought to the previously described desired level for the initial drying period by means of the vacuum pump. After the initial period is completed—which might be from one-half hour to one hour or longer—the vacuum is brought to the highest possible value, i.e., lowest pressure by fully opening vacuum pump valve 14 of FIGURE 1. Valve 14 is thereafter closed and gas flow control valve 13 opened for a long enough time to permit light gas to flow into the drying chamber until the desired gas pressure is reached. At the same time, the heat input must be increased by means of a suitable source in order to supply the necessary heat for the increased drying rate. After a period of time, the pressure in the chamber will rise as a result of air leaking into the chamber and occluded air released from the frozen material. This air will impede the movement of water vapor through the dry porous shell and will cause the drying rate to decrease. In order to restore the drying rate, valve 14 is again opened until the chamber reaches the previously discussed high vacuum; thereafter, vacuum pump control valve 14 is again closed and gas flow control valve 13 again opened to admit more light gas. These alternating steps of evacuating the chamber and adding light gas are continued until the drying process is completed, after which the chamber is opened and the dry product removed.

Another method of operation, which avoids the alternate operation of valves 13 and 14, is to set both of these valves in fixed positions, thus allowing light gas to flow in at a constant rate and maintaining a constant pressure in the drying chamber. With this method of operation, the gas in the chamber is a constant mixture of air and light gas. The composition of the gas and the total pressure in the chamber can be controlled at any desired values by proper positioning of the valves 13 and 14.

At all times in the above described process, the drying removal of water vapor. As illustrated in FIGURE 1, chamber must be open to the refrigerated condenser for one method which could be used to exhaust the air polluted gas from the drying chamber is commonly known as a refrigerated condenser method. In this method the moisture laden gas is directed into contact with refrigerating coils or plates to condense any condensible material. This results in ice forming which is thereafter tapped from the condenser as waste. The vacuum pump is also connected to the refrigerated condenser and is operable to exhaust any non-condensible gas thereby maintaining the high vacuum when vacuum control valve 14 is open.

Figure 2:
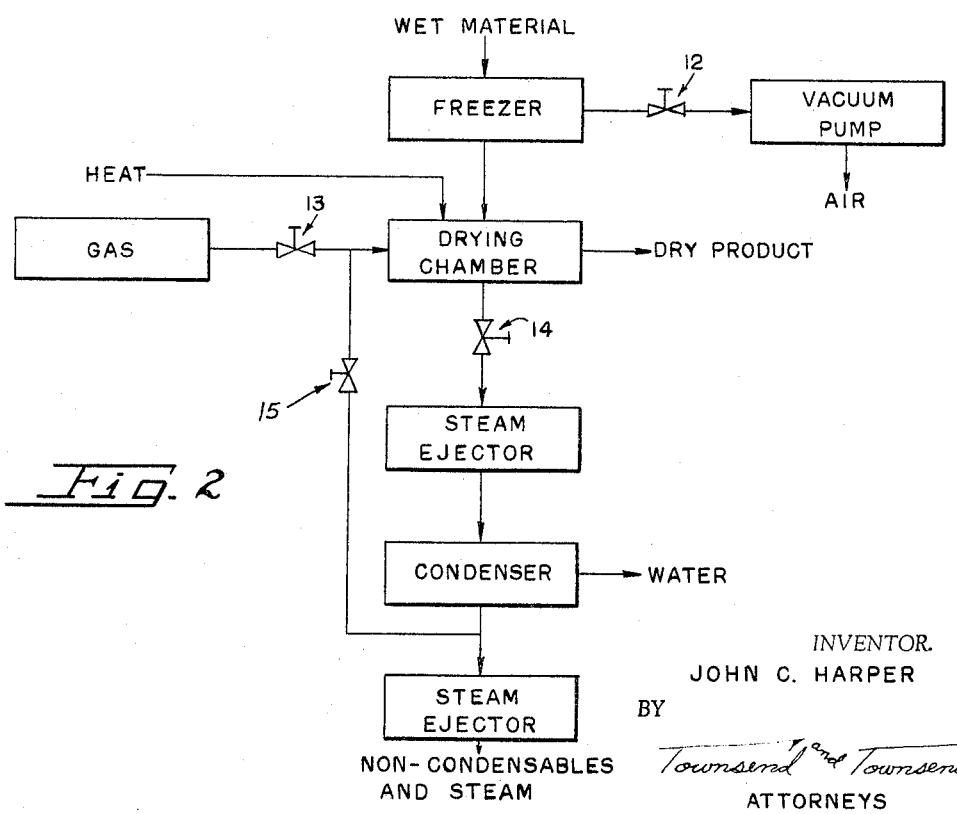
FIGURE 2 illustrates the freeze-drying process in flow diagram form using a steam ejector type of moisture removal system.

Operation with steam ejectors (FIGURE 2) for removal of water vapor can be used in place of a refrigerated condenser and vacuum pump of FIGURE 1. It should be noted at this time that the drying portion of the method or system is substantially identical to that of FIGURE 1. In operation when light gas is not being admitted through gas control valve 13, the residual gas in the chamber will become primarily water vapor rather than air during the drying period. After the rapid initial drying period is completed, gas flow control valve 13 is opened to admit light gas at a predetermined rate. The total pressure in the chamber can be controlled and kept at the desired level by proper positioning of ejector control valve 14. Steam ejector systems suitable for freeze-drying operation will normally consist of several stages, with at least one interstage condenser for removal of water vapor. A portion of the gas stream from one such condenser, consisting of a mixture of light gas and air with a relatively small amount of non-condensed water vapor, is recycled to the drying chamber through feedback gas control valve 15. The remainder of the exhausted stream, which must be of sufficient volume so that the air carried out of the chamber is equal in quantity to the air entering the chamber from leaks and the frozen material, passes through successive ejector stages and is finally discharged to the atmosphere.

By proper control of gas flow valve 13, ejector control valve 14, and gas feedback valve 15, the total gas pressure and the concentration of light gas in the drying chamber can be maintained at any desired values. All valve operations described herein may be done manually or by suitable automatic control methods which will be apparent to those skilled in the art.

The same methods of operation described above may be used in processes in which frozen material is admitted continuously to the drying chamber and dry product continuously withdrawn; or in a semi-continuous process in which a frozen material is admitted and dry product withdrawn at intermittent intervals of time.

Although several possible embodiments of this invention have been described and illustrated, it should be understood that various changes can be made without departing from the scope of the invention as defined by the appended claims.

What is clamed is:

1. In a method for drying material the steps comprising: placing the material to be dried in a low pressure atmosphere containing a light gas selected from the group consisting of hydrogen and helium, supplying heat thereto, and adding a sufficient amount of said light gas to said atmosphere to overcome effectively the effect of air leakage to an extent necessary to maintain the ratio of light gas to air of not less than about 10% of said light gas in the total volume of said atmosphere.

2. A method in accordance with claim 1 and wherein the degree of heat is sufficient to vaporize moisture contained in the material to be dried.

3. A method in accordance with claim 1 wherein the material to be dried is selected from the class consisting of pharmaceuticals and foods.

4. A method in accordance with claim 1 and including the step of preliminarily removing part of the water in said material.

5. A method of freeze drying materials comprising the steps of freezing the material to be dried, placing the frozen material in a low pressure atmosphere containing a light gas selected from the group consisting of hydrogen and helium and maintaining the material in a frozen state, supplying heat thereto sufficient to sublime water in said material, and adding a sufficient amount of light gas to said atmosphere to overcome effectively the effect of air leakage into said atmosphere to an extent necessary to maintain the ratio of light gas to air at not less than about 10% light gas in the total volume of said atmosphere.

6. A method in accordance with claim 5 wherein the ratio of air to light gas is maintained by removing at least part of the low pressure atmosphere in contact with the frozen material and replacing it with a substantially equal volume of the said light gas.

7. A method in accordance with claim 6 wherein said removing and replacing steps are executed intermittently on substantially said entire low pressure atmosphere.

8. A method in accordance with claim 6 wherein said removing and replacing steps are executed substantially continuously on a relatively small portion of said low pressure atmosphere.

9. A freeze drying apparatus comprising: a processing chamber adapted to receive a quantity of materials to be freeze dried, said chamber being substantially airtight, a supply of processing gas selected from the group of hydrogen and helium, means to supply said processing gas to said chamber under sufficient pressure and in a sufficient volume to create a processing gas atmosphere within said chamber of not less than about 10% by volume of said light gas in the total volume of said atmosphere, means to withdraw the said atmosphere from said chamber and charge the atmosphere with additional processing gas to maintain the ratio of processing gas in said atmosphere to at least about not less than 10% of said gas to total volume of said atmosphere.

References Cited by the Examiner

UNITED STATES PATENTS

| | | | |
|---|---|---|---|
| 1,799,248 | 4/1931 | Reinhardt | 34—15 |
| 2,380,339 | 7/1945 | Siedentopf | 34—5 |
| 2,414,940 | 1/1947 | Flosdorf et al. | 34—5 |
| 2,435,503 | 2/1948 | Levinson et al. | 34—5 |
| 2,480,146 | 8/1949 | Lee | 34—5 X |
| 2,751,687 | 6/1956 | Colton | 34—5 |
| 3,176,409 | 4/1965 | McKeever | 34—5 |
| 3,192,643 | 7/1965 | Reintard | 34—5 |
| 3,230,633 | 1/1966 | Hamilton | 34—15 |

OTHER REFERENCES

Publication: Science, "Sublimation Freeze Drying," vol. 130 (September 1959), pages 628–629.

WILLIAM J. WYE, *Primary Examiner.*